United States Patent [19]

Chang

[11] Patent Number: 4,670,203

[45] Date of Patent: Jun. 2, 1987

[54] METHOD FOR MANUFACTURING MOLDED PRODUCTS OF POLYETHYLENE TEREPHTHALATE

[76] Inventor: Shao Chi Chang, Room No. 503, Brier Lamtam, No. 57, Nakano-shinden, Shizuoka, Japan

[21] Appl. No.: 636,079

[22] Filed: Jul. 31, 1984

Related U.S. Application Data

[63] Continuation of Ser. No. 321,535, Nov. 16, 1981, abandoned, which is a continuation of Ser. No. 715,348, Aug. 17, 1976, abandoned.

[30] Foreign Application Priority Data

Aug. 30, 1975 [JP] Japan ................... 50-105531
Aug. 30, 1975 [JP] Japan ................... 50-105532
Sep. 11, 1975 [JP] Japan ................... 50-110182

[51] Int. Cl.$^4$ ............................... B29C 47/76
[52] U.S. Cl. ................... 264/40.6; 264/101; 264/102; 264/171; 264/328.18; 264/331.16; 264/331.18; 264/331.21; 264/349; 425/144; 425/203; 425/208
[58] Field of Search ............... 264/24, 40.6, 176 R, 264/176 F, 328.18, 331.16, 331.18, 331.21, 521, 526, 532, 535, 537, 540, 101, 349, 171; 425/144, 143, 208, 548, 203

[56] References Cited

U.S. PATENT DOCUMENTS

| | | | |
|---|---|---|---|
| 3,391,232 | 7/1968 | Jackson | 264/40 |
| 3,496,133 | 2/1970 | Hoffman | 260/40 |
| 3,496,603 | 2/1970 | Listner et al. | 425/144 |
| 3,658,981 | 4/1972 | Fleming et al. | 264/349 |
| 3,733,059 | 5/1973 | Petit | 425/143 |
| 3,745,150 | 7/1973 | Corsover | 260/75 |
| 3,784,657 | 1/1974 | Hutchinson et al. | 264/40.6 |
| 3,819,773 | 6/1974 | Pears | 264/37 |
| 3,826,477 | 7/1974 | Kunogi et al. | 259/191 |
| 3,931,094 | 1/1976 | Segal | 264/176 R |
| 4,272,475 | 6/1981 | Chang | 264/210.1 |
| 4,435,546 | 3/1984 | Bica et al. | 264/176 R |

FOREIGN PATENT DOCUMENTS

| | | | |
|---|---|---|---|
| 0027576 | 12/1967 | Japan | 264/176 |
| 0004546 | 2/1968 | Japan | 264/176 F |
| 0025949 | 11/1968 | Japan | 264/176 F |
| 0020846 | 3/1973 | Japan . | |
| 0121057 | 10/1978 | Japan | 264/331.21 |
| 1228691 | 4/1971 | United Kingdom | 264/328 |

Primary Examiner—Jeffery Thurlow
Attorney, Agent, or Firm—Hoffmann, Dilworth, Barrese & Baron

[57] ABSTRACT

A method for manufacturing molded products of polyethylene terephthalate by injection molding a material containing polyethylene terephthalate as the principal component characterized by using virgin and/or waste polyethylene terephthalate of average molecular weight of more than 10000 to which polymer such as nylon and/or inorganic fillers can be added as required, and molding said material under the following molding conditions by a general type or vent type molding machine:

(a) Control of a temperature of a cylinder of the molding machine in the range of melting temperature of resin plus/minus 35° C., and
(b) Control of the staying hour of resin in the cylinder to be within 15 minutes.

22 Claims, 4 Drawing Figures

PRIOR ART Fig. 1
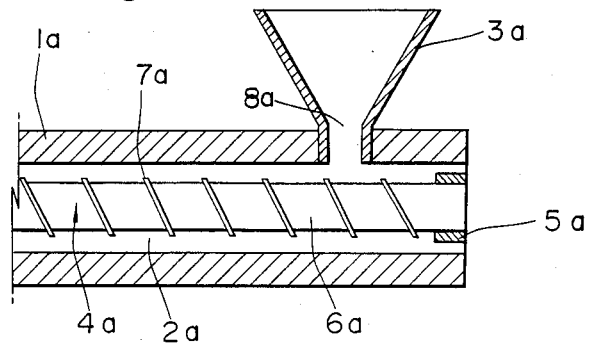
Fig. 2
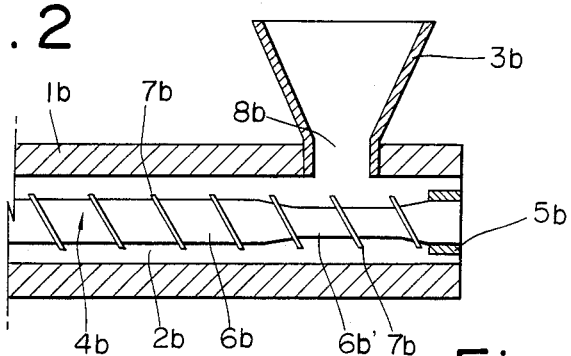
Fig. 3
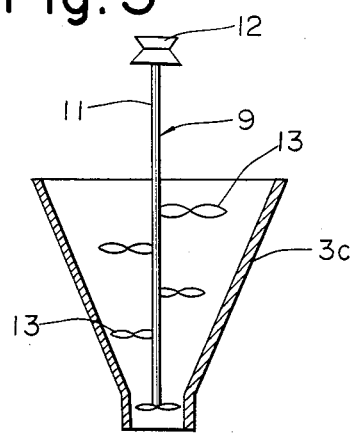
Fig. 4
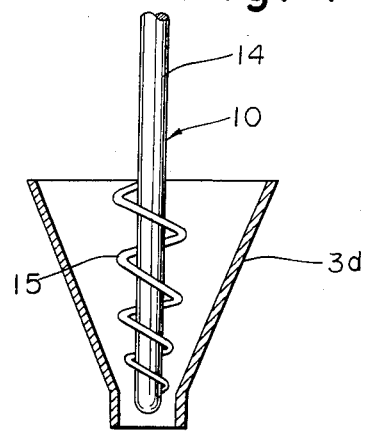

METHOD FOR MANUFACTURING MOLDED PRODUCTS OF POLYETHYLENE TEREPHTHALATE

This is a continuation of copending application Ser. No. 321,535 filed Nov. 16, 1981, now abandoned, and which was a continuation of copending application Ser. No. 715,348 filed Aug. 17, 1976 and now abandoned.

BACKGROUND OF THE INVENTION

The present invention relates to a method for manufacturing molded products of polyethylene terephthalate (hereinafter referred to as PET) which are tough and have the characteristics required for the applications of the molded products, by using the PET, PET containing less than 20% of the isomer or PET blended with other polymers and/or inorganic fillers as a molding material.

Since the PET has highly useful characteristics, tough and durable products can be obtained by making fibers and films through extrusion, drawing and heat treatment by appropriate machines. Thus, when the PET is used as the fibers or films, it is drawn and can be heat-treated with the property of orientation given in the manufacturing processes of fibers or films, and the products will therefore be as tough as to exhibit fully the characteristics of PET.

Even if the molded products of the PET are manufactured by known methods with ordinary injection molding machines or extrusion molding machines, the products obtained cannot be drawn, and the PET is subject to hydrolysis and thermal deterioration due to oxidation during molding, slow in the crystallization and inferior in moldability. Therefore the PET products obtained by injection molding or extrusion molding are not so tough as the PET fibers and the PET films and extremely brittle with a variation of quality, and it is difficult to obtain excellent molded products of PET. Accordingly, in the conventional molding of the PET, the products are reinforced with glass fiber, a stabilizing agent is used to prevent qualitative deterioration and it is necessary to use a material of large molecular weight 18,000 to 30,000. Despite, the above-mentioned defects such as difficulty in obtaining tough high quality products, proneness to occurrence of incomplete molded products and necessity of expensive materials are not yet eliminated. Moreover, in conventional injection molding and extrusion molding of the PET, it has been considered difficult to use scraps and wastes of the PET and to mold the PET which was blended with various kinds of polymers or inorganic fillers.

BRIEF SUMMARY OF THE INVENTION

The object of the present invention is to provide a method for molding the PET which may be blended with other polymers or inorganic fillers as required in molding of the PET in order to prevent thermal deterioration and to control crystallization of the PET even when scraps and wastes of the PET are used, thus manufacturing excellent molded products of the PET. The control of crystallization of the PET is fulfilled by effectively utilizing the characteristic of the PET that, for example, the second-order transition point (glass transition point) of the PET is approximately 67° to 81° C., the velocity of crystallization is extremely low at 120° C. or less and is quicker at 120° to 190° C. in response to the degree of temperature, and crystals gradually disappear at approximately 255° to 265° C. and completely vanish at approximately 290° C. The crystallinity (degree and velocity of crystallization and size of crystal) of the PET is controlled by appropriately setting and controlling the pretreatment conditions (drying) of material, temperatures of injection molding or extrusion molding and temperature of the molds and cooling water through the molds and performing the cooling and solidification of the PET uniformly and quickly. Through these processes and operations, tough and highly heat resistant products can be molded.

The present invention permits molding of excellent products with different characteristics, using the PET which is blended appropriately with one or more than two kinds of other polymers and inorganic fillers as required to make control of the crystallinity of the PET easier.

In other words the present invention provides a method for manufacturing molded products of the PET by molding a material containing the PET as a principal component characterized by using the dry virgin and/or waste PET of average molecular weight more than 10000 as a material and molding said material under the following molding conditions:

(a) control of a temperature of a cylinder of a molding machine within the range of melting temperature ±35° C. of resins, and (b) control of the staying time of resins in the cylinder to be within 15 minutes.

Other objects and features of the present invention will be known from the following descriptions.

BRIEF DESCRIPTION OF THE DRAWINGS

FIG. 1 is a sectional view illustrating a partly omitted example of a conventional molding machines, FIG. 2 is a sectional view illustrating a partly omitted example of the molding machine useful for the present invention, and FIGS. 3 and 4 are a sketch of a hopper illustrating other examples of the molding machine useful for the present invention, respectively.

DETAILED DESCRIPTION OF THE INVENTION

The following describes in detail the present invention.

The present invention uses polyethylene terephthalate as a saturated polyester. Polyethylene terephthalate (PET) referred to in the present invention contains more than 80% of polyethylene terephthalate which is polymerized by reacting terephthalic acid or dimethylterephthalate (DMT) with ethylene glycol the polyethylene terephthalate containing, less than 20% of isomer or similar polymer, such as polyester, or the like.

The PET useful for the present invention can be available in the form of chips or pellets of virgin material for fibers and films. Moreover, pulverized waste PET, i.e, pulverized scraps and waste molded products of the PET or chips and pellets obtained by reproducing the waste PET can also be used. Virgin material, scraps and waste molded products can be used individually or simultaneously. The average molecular weight of the PET can be more than 10,000 and is preferably approximately 20,000. Though the PET of large molecular weight more than 30,000 can be used, highly tough molded products cannot be obtained from the PET of molecular weight less than 10,000. In case of using scraps and waste molded products of the PET, the stabilizing agents, pigment, aggregate, catalysts, flame retarder etc. contained in these scraps and waste molded products scarcely affect the molding but they are preferably used so that the quantity of the scraps and waste molded products of the PET is less than 50 weight % of the total weight of each molded product. When the pulverized waste PET is used, the PET pellets of preferably more than 10 weight %, further preferably more than 30 weight %, or the pellets or fiber of other polymer of less than 60 weight % or the powdery granules or fiber of inorganic material of less than 60 weight % in reference to the total weight of molded products are blended in the pulverized PET to smooth feeding of the pulverized PET into the screw of the molding machine. When the pulverized particles of scraps are used as the PET material at the blended ratio of less than 50 weight % for a virgin material, the molded products can be inexpensively manufactured and glass fiber or inorganic powder, can be mixed satisfactorily.

The water content in the PET is preferably less. If the PET contains a considerable amount of water, it will accelerate hydrolysis of molten PET in molding, cause thermal deterioration of the quality and give brittleness. Therefore, the PET should be treated in advance by drying to reduce the water content of the PET to less than 1 weight %. In this case, the preferable range of water content in the PET can be 1 weight % for molding by means of the vent type extrusion molding machine with a vacuum pump but it is preferably 0.5 weight % for molding by means of the vent type injection molding machine with a vacuum pump. When such vent type molding machine with the vacuum pump is not used, it is more preferable to reduce the water content to 0.1 weight % or less and the most preferable range of the water content is less than 0.03 weight %. The drying treatment to reduce the water content in the PET to 0.1 weight % or less is generally performed for 3 to 6 hours at 110° to 150° C. This drying process serves to control the degree of crystallization of the PET in the final molded products in addition to reduction or removal of the water content in the PET. In other words, for the purposes of reducing the degree of crystallization of the PET and manufacturing the final molded products with excellent toughness, the PET material is dried at a lower temperature for a long period of time, for example, at 110° to 120° C. for 5 to 8 hours and, for the purposes of increasing the degree of crystallization and manufacturing the final molded products with excellent heat resistance, the PET material is dried at a higher temperature for a short period of time, for example, at 130° to 150° C. for 3 to 5 hours. In case a vacuum drying method is used for drying the PET, it is performed, for example, at 105° to 130° C. for 1 to 4 hours under the reduced pressure of less than 50 mm Hg. The drying by means of the infra-red ray is satisfactory within one hour at 115° to 130° C.

As the molding material, the PET can be independently used and the PET blended with other polymer or inorganic material can also be used. The melting point of the PET is lowered by mixing the other polymer with the PET and therefore the molding of the PET can be performed by lowering the melting point of the PET and preventing thermal deterioration of the quality.

The polymers blended with the PET are polyolefin, such as polyethylene and polypropylene, polystyrene, acrylonitrile-butadiene-styrene copolymer (ABS resin), polybutyleneterephthalate and polyamide such as nylon 6, nylon 66, nylon 8, nylon 12, nylon 7 and nylon 11, and cotton, rayon, hemp etc. can be blended. These polymers are individually blended with the PET or more than two kinds of the polymers are blended with the PET. The blending quantity of the polymers is preferably less than 60 weight % of the total weight of the molded product, and the more preferable range of the blending quantity is 5 to 40 weight % for polyolefin and polystyrene, 5 to 30 weight % for ABS resin, 5 to 40 weight % for polybutylene terephthalate, 5 to 50 weight % for polyamide and 5 to 30 weight % for cotton, rayon and hemp. The total blending quantity of more than two kinds of the above-mentioned polymers should be less than 60 weight %, preferably less than 50 weight %. For example, polyamide is 10 to 50% and polyethylene is 5 to 30%, polyamide is 10 to 50% and polybutylene terephthalate is 5 to 20%, and polyethylene is 10 to 30% and polypropyrene is 5 to 20%. Though the polymers can be blended with the PET, exceeding the blending quantities shown above, the blending quantity should be, in this case, limited to the values shown above since the characteristics of the PET in the final molded product will reduce. Chips of a virgin material and scraps or wastes can be used as the polymers. The blending quantity of these scraps and wastes of the polymer is preferably less than 20 weight % of the total weight of the molded products. The water content of the polymers should be adjusted as in case of the PET.

Moreover, inorganic fillers can be blended with the PET or the PET blended with the other polymer at the rate of less than 60 weight % of the molded product. The inorganic fillers should excel in dispersibility when mixed in the PET and should not show disadvantageous chemical reaction with the PET and should preferably not have hygroscopic property. For example, the PET is blended with less than 5 weight % of boron nitride (BN) (in reference to the molded product; the same applied to the rest) less than 45 weight % of glass fiber, less than 35 weight % of glass balls and glass powder, less than 40 weight % of powders of feldspar, quartz, carbon, aluminium oxide, ceramic and marble, or less than 60 weight % of metallic powder, fiber and whisker such as iron, aluminium, copper, molybdenum, antimony, tungsten and boron. The above-mentioned inorganic fillers can be individually blended or more than two kinds of inorganic substances can be blended with the PET. Such selection is determined in accordance with the characteristics of the final molded products. In case of blending more than two kinds of said inorganic fillers or the inorganic fillers and other polymer with the PET, the total blending quantity is less than 60 weight %, preferably less than 50 weight %. In case of the powders of said inorganic fillers, the grain size of the powder particles can be approximately 100 mesh and is preferably smaller than 250 mesh or finer than 50 microns. When the inorganic fillers which are surface-treated are used as required, a more favorable product is obtained. Even though the blending quantity of inorganic filler is relatively small, the inorganic filler can be well mixed in pulverized particles of the waste PET and the pulverized particles of the waste PET can be easily fed to entangle with the screw of the molding machine. For example, boron nitride though its blending quantity of more than 0.03 weight % can be favorably mixed with said pulverized particles of the PET and the mixture can be molded by feeding the pulverized particles of the PET to the screw of the molding machine.

A pigment, dyestuff, surface treating agent, flame retarder etc. can be added as required in addition to said polymer and inorganic fillers.

Instead of mixing the PET with a polymer and an inorganic filler at the time of molding, virgin PET and PET wastes of average molecular weight of more than 10000 are blended with at least one of the other polymer and/or the inorganic filler of 0.5 to 60 weight %, the blended substance is extrusion-molded by the vent type extrusion molding machine with vacuum pump under the pressure reduced to less than 100 mm Hg, preferably 50 mm Hg and further preferably 20 mm Hg and PET materials such as chips and pellets for molding which are cut in appropriate sizes and shapes can be manufactured and used for the molding material. In this case, the PET prepared by reacting and polymerizing terephthalic acid or dimethylterephthalate with ethyleneglycol in a molten state shortly before molding chips and pellets for fibers and films can be used. When this polymerization is almost finished or immediately after completion of the polymerization, said other polymer and/or inorganic filler are blended in the PET in the polymerizing oven with the pressure of less than 50 mm Hg and the PET mixture is extruded in desired shapes for the molding material after thorough mixing in the polymerizing oven. In this case, the other polymer and inorganic filler to be blended should not be decomposed or deteriorated and should have excellent heat resistance.

The following describes the manufacturing method for molded PET products using said molding materials. The molding machine to be used is preferably an injection molding machine in which the temperature can be well controlled or a vent type injection molding machine with vacuum pump. In selection of the injection molding machine, it is important to select a screw type injection molding machine with distinguished dispersibility or an effectively degassing type molding machine, in addition to excellence in temperature control. Thus, the molded PET products will be free from thermal deterioration and easy in control of crystallinity, and stable and excellent products can be obtained. Though a general type extrusion molding machine can be used for extrusion molding, it is preferable to use the vent type injection molding machine with vacuum pump.

The above specified material is fed into the injection or extrusion molding machine through its hopper. In this case, a humidity preventing apparatus such as, for example, a hopper drier should be preferably provided to protect the material to be fed from the humidity since thermal deterioration in heating the resin material can be prevented. Resin material supplied through this hopper are heated and melted in the cylinder of said molding machine. The heating temperature for the resin materials differs with the kinds and quantities of other components to be blended with the PET and the staying time of resins in the molding machine and should be the lowest temperature, at which the resins are melted, plus/minus 35° C. In other words, the temperature in the heating cylinder should be as low as possible to prevent hydrolysis and thermal deterioration from taking place. In this case, the heating temperature is preferably the resin melting temperature plus/minus 25° C. for injection molding and the resin melting temperature plus/minus 35° C. for extrusion molding. The preferable range of said heating temperature is 265° to 290° C. for the PET alone, 240° to 280° C. for the PET blended with polyethylene, a temperature lower than the above for the PET blended with polyamide and 265° to 300° C. for PET blended with the inorganic substance. However, the preferable heating temperature is generally below 275° C. in order to prevent thermal deterioration.

In molding, it is preferable to measure the temperature of resin by a surface temperature gauge or a thermocouple when the resin passes through the injection nozzle of the injection molding machine or the die or the adapter of the extrusion molding machine. Since the actual temperature of the molten PET can be measured as described above, the information is fed back and the heating of the cylinder is adjusted to appropriately control the internal temperature of the cylinder of the molding machine for control of crystallinity, size of crystal and condition of crystallization of the PET to fill the requirements for the characteristics of the final molded products, and the molding temperature can be set to a specified temperature. In other words, it is preferable that a temperature detecting section is provided in the resin passage in the molding machine to directly measure the temperature of resin shortly before injection or extrusion, the molding conditions are controlled mechanically in accordance with this measured temperature of resin and the variation of temperature when the resin is injected or extruded from the nozzle of the molding machine is maintained to be 3° C. higher and lower than the set temperature so that the resin may be molded in the optimum range of molding temperature.

Since said materials should be fully kneaded, it is preferable to select a screw with suitable shape of the threaded part and pitch and to provide a special nozzle in the molding machine. Said materials are fully kneaded and dispersed and are molded in the specified shape within 15 minutes, preferably 5 minutes and further preferably 3 minutes of the staying time in the cylinder. If the resin stays in the cylinder for an excessively long period of time, the PET deteriorates, the strength of the molded product reduces and the molded products become so brittle as to be easily broken, and therefore the staying time should be as short as possible. Particularly, when the heating temperature for resins is high, the staying time of resins in the cylinder should be reduced.

For manufacturing the injection or extrusion molded products, the vent type injection or extrusion molding machine with a vacuum pump is used as the molding machine and the pressure in the molding machine is reduced by the vacuum pump through the vent to less than 150 mm Hg, preferably to less than 100 mm Hg and further preferably to less than 50 mm Hg and the water content and oxygen in the material are removed. Accordingly, the preliminary drying treatment of the material can be omitted or simplified, hydrolysis and thermal deterioration of the PET can be prevented, the temperature in the cylinder can be raised a little than usual, the staying time of the resin in the cylinder can be approximately 15 minutes, molding of large size products and thick wall products can be easy and the production can be increased. When the vent is provided at a position where the temperature of material rises up to 120° to 150° C., that is, at a position as long as ⅓ of the overall length of the cylinder of the molding machine away from the hopper, the water content in the material is apt to be effectively removed. If a gas hole, for example, is provided at a lower part of the hopper of the molding machine and dry nitrogen gas is supplied from the lower part to the upper part of the hopper through this gas hole so that the dry nitrogen gas counterflows against the flow of material supplied from the upper part to the lower part of the hopper, the oxygen in the material is replaced by the nitrogen, the hydrolysis and thermal deterioration of the PET are prevented in the course of molding and better molded products can be obtained. In this case, the water in the material can be considerably removed when a heated dry nitrogen gas is used and therefore further favorable results are obtained and thus the staying time of resin in the cylinder can be relatively long when the nitrogen gas counterflow method is employed.

As described above, the molten and kneaded material is molded in the specific shape by injection or extrusion molding. In this case, the temperature of the molds is maintained at a fixed level (5° C. higher and lower than the set temperature) and the products with the specified characteristics are stably molded with a slight variation of the quality. For extrusion molding, the temperature of the nozzle should be the melting temperature of resin minus 10° C. and plus 15° C. The mold temperature differs with the characteristics required for the molded products; in case of injection molding, the mold temperature for molding the PET to be non-crystalline should be 10° to 75° C., preferably approximately 30° C., to suddenly cool the PET and to mold the PET in the form of crystal and for manufacturing the molded products with excellent heat resistance, the mold temperature should be 120° to 160° C. to promote crystallization of the PET. Moreover, the mold temperature for obtaining the molded products with high strength and heat resistance should be set in the range of 130° to 150° C. The mold for injection molding should be designed to be suitable for molding the PET; for example, the diameter of the gate for molding the PET above or the PET blended with the other polymer can be approximately 1 mm and that for molding the PET blended with the inorganic substance of large grain size and shape such as, for example, glass fiber, should be more than 2 to 3 mm. For molding the molded products with different thicknesses, the mold should be designed so that the cooling water quickly flows through a part of the mold corresponding to a thick wall part of the molded product and the cooling water is circulated for cooling at a high pressure of 5 to 7 kg/cm$^2$, and the mold temperature becomes uniform quickly over the corresponding part and the crystallinity of the molded product of the PET can be more appropriately controlled. The mold should be designed and operated so that the temperature of the mold at both sides (the core and the cavity which are split) is uniform wherever possible. If the mold temperature is not appropriate with an uneven distribution of, for example, difference more than ±5° C., excellent molded products cannot be obtained and, if there is a temperature difference of more than 10° C., the molded products accompany remarkable variation of the physical properties of the products. Thus, the mold should be carefully designed so that a larger volume of cooling water flows quickly to uniformly cool the mold and the cold water or the like can be used as the cooling medium instead of the room temperature water Furthermore, the mold should be designed to have the mold volume (total volume of molded product and runner) of more than 25 volume %, preferably 50 volume %, more preferably 90 to 95 volume % of the maximum injection capacity of the injection molding machine.

The molding is possible with a mold of which the size is less than 50 volume % and more than 25 olume % of the maximum shot volume of the injection molding machine. In this case, other molding conditions should be strictly controlled to obtain tough molded products.

In detail, tough molded products are obtained by molding the material with more than one of various considerations such as, for example, thorough drying of the material to reduce water content from the PET to at greatest less than 0.05 weight %, preferably less than 0.02 weight %, molding under a reduced pressure (less than 100 mm Hg) in the cylinder, counterflowing of dry nitrogen gas to dry the material supplied from the hopper, slightly lowering the molding temperature and controlling the staying time of the material to be within 10 minutes, preferably within 5 minutes. If the mold capacity is more than 50 volume %, tough molded products can be relatively easily obtained even though the molding conditions are not strictly controlled. The shot time for molding the resin is less than 3 minutes especially for large size products, preferably less than one minute, further preferably less than 30 seconds. The staying time of resin in the cylinder can be shortened by controlling the shot time and the capacity of mold and accordingly the hydrolysis and thermal deterioration of the PET can be prevented and though molded products can be obtained. In this case, if said nitrogen gas counterflow method is employed and the molding is performed under the conditions such as the shot time within one minute, preferably 30 seconds and the mold capacity of more than 25 volume %, preferably 50 volume %, more preferably 90 to 95 volume %, extremely favorable molded products can be obtained.

The control of the crystallinity of the molded products is performed by adjusting the preliminary drying condition for the PET and the cooling condition for the mold as described above, and blending of powders of other polymers and inorganic fillers further facilitates the control of crystallinity. Particularly when a metallic powder is blended in the PET, the material is quickly and uniformly cooled as a whole due to excellent heat conductivity of metal and the crystallinity can be controlled satisfactorily. It is effective for control of the crystallinity to appropriately control the shot pressure, for example, to increase the shot pressure so that crystallization is easy.

For obtaining the specified molded products using pulverized particles of wastes including of scraps of PET products as a material, a molding can be used in which the outlet port of the hopper is given a large inside diameter and the core diameter of the screw shaft, which feeds out and kneads the material supplied from the hopper, opposing to the outlet port of the hopper is considerably small along a distance slightly longer than the inside diameter of the outlet port of the hopper. When this molding machine is used, the pulverized particles of waste PET need not always be blended with pellets of the PET and other polymer or powdery inorganic substances. When the pulverized particles of waste PET are used independently, they can be satisfactorily fed in the screw of the molding machine and easily fed out, thus ensuring efficient and steady molding. FIGS. 1 and 2 show this configuration of the molding machine; FIG. 1 shows an example of conventional molding machine and FIG. 2 an example of the molding machine useful for the present invention. The body 1a of the horizontal type injection or extrusion molding machine shown in FIG. 1 is made as a cylindrical type and the cylinder chamber 2a is formed in the cylinder 1a. One end of this cylinder chamber 2a in the axial direction is closed. One end of the body 1a in the axial direction is opened at its upper side and the lower end part of funnel type hopper 3a is connected to this opening to communicate the cylinder chamber 2a and the hopper 3a. The columnar screw 4a is provided in the cylinder chamber 2a along the axial direction, and one end part of this screw being held in the bearing 5a and passing through one end face of the cylinder chamber 2a is connected through the joint, reduction gear etc. (not shown) to the motor (not shown). The peripheral surface of the screw shaft of the screw 4a comprises the core 6a and the thread 7a provided on the periphery of the screw 4a. As shown in FIG. 1, in case of the conventional molding machine, the core diameter of the screw 4a is almost equal over the screw 4a. Contrary to this, in case of the present invention, the inside diameter of the outlet port 8b of the lower part of hopper 3b is made larger than the inside diameter of outlet port 8a of the hopper 3a of the conventional molding machine to facilitate feeding of the material into the cylinder chamber 2b. At the same time, the core diameter of core 6b' of the screw shaft of screw 4b opposing to the outlet port 8b of the hopper 3b is made considerably smaller than the core diameter of the other core 6b of screw 4b (for example, 3 to 20 mm smaller than the other core) along a distance slightly longer than the inside diameter of the outlet port 8b, that is, along approximately 10 cm in case of an ordinary size molding machine to ensure feeding of the material supplied from the hopper 3b to the screw 4b. Since the screw 4b catches satisfactorily even a slight-weight material, the material can steadily be fed through the cylinder chamber 2b. Accordingly, when such a molding machine as described above is used, it is not always necessary to improve feeding of the material to the screw by mixing pulverized particles of the PET in the PET pellets to increase the specific gravity of the entire material. The core of the screw just below the outlet port is deep and therefore engagement of the material with the screw can be improved even when the pulverized particles of the PET are used independently.

Moreover, as shown in FIGS. 3 and 4, in the conventional molding machine, a material feeding device such as agitator 9 and screw type feeder 10 is provided in the hopper 3c and 3d to prevent difficult feeding of material into the cylinder chamber due to bridging of the material in the hopper, thus ensuring positive feeding of the material into the cylinder chamber and satisfactory feeding of the material to the crew. FIGS. 3 and 4 can be referred to this point. Agitator 9 comprises shaft 11, pulley 12 attached to the upper end of shaft 11 and a plurality of vanes 13 which are orthogonally attached to shaft 11. Vanes 13 are attached to the shaft with equal distance and deviated by every 180 degrees in the sequence from the upper vane to the lower vane and the vanes 13 is made as a short length so that the vanes 13 do not contact the internal surface of hopper 3c. Two vanes are attached to the lower end of shaft 11 and each vane 13 is made spiral and the material supplied into the hopper 3c moves down while being turned as vane 13 rotates and the material is prevented from forming the bridge. The vanes 13 can be simply a flat type. Agitator 9 is connected from pulley 12 to the motor through the transmission belt, reduction gear etc. (these are not shown) The upper end of shaft 11 can be direcly connected to the motor.

The screw type feeder 10 is provided with thread 15 on the periphery of the screw shaft 14 so that the diameter is gradually smaller from the upper part to the lower part end, when the screw shaft 14 rotates or moves vertically, the material in the hopper goes down while swirling in the hopper 3d. This screw shaft 14 is connected to the motor through the joint, reduction gears etc. (these are not shown) and is rotated or moved vertically by the motor. Accordingly, the material can be fed into the cylinder chamber positively and continuously by using the material feeding devices such as the agitator, screw type feeder as described above and the feeding of material to the screw can therefore be satisfactory. Even though the pulverized particles of waste PET, particularly the film wastes which are difficult to be directly fed are used independently, the molding can be performed positively and the pellets of the PET need not be blended with the pulverized particles of waste PET.

EXAMPLE 1

Table 1 shows the results of comparison of the strength of molded products which are obtained by using a virgin PET of average molecular weight of 16,000 to 17,000 and water content of less than 0.1 wt. % as a material for molding in both cases that the temperature of resin is accurately controlled while measuring the temperature of PET material with the surface temperature gauge set in the resin passage of the injection nozzle of the injection molding machine and the temperature of resin is not controlled.

TABLE 1

|  | When the temp. of resin is accurately controlled | | When the temp. of resin is not controlled |
|---|---|---|---|
|  | (1) | (2) |  |
| Cylinder temperature (°C.) I | 235 | 235 | 235 |
| II | 250 | 250 | 250 |
| III | 270 | 270 | 265–270 |
| Nozzle temperature (°C.) | 265 | 270 | 270 |
| Temp. of resin fed out from nozzle | 265 ± 2 | 265 ± 2 | 270 ± 5 |
| Mold temp. (°C.) | 50 ± 2 | 50 ± 2 | 50 ± 2 |
| Strength of molded product (kg/cm²) | 680 | 650 | 555–670 |

The results of similar molding to the above using the PET scraps alone are as shown in Table 2.

TABLE 2

|  | When the temp. of resin is accurately controlled | When the temp. of resin is not controlled |
|---|---|---|
| Cylinder temperature (°C.) I | 235 | 235 |
| II | 250 | 250 |
| III | 270 | 265–270 |
| Nozzle temperature (°C.) | 265 | 265 |
| Temp. of resin fed out from nozzle (°C.) | 265 ± 2 | 270 ± 5 |
| Mold temp. (°C.) | 50 ± 2 | 50 ± 2 |
| Strength of molded product (kg/cm²) | 630 | 400–610 |

As shown above, the variation of the resin temperature is reduced by controlling the resin temperature and, when the PET scraps are used as a material for molding, the molded products of PET of a given quality with less variation of the strength and with high strength are obtained.

In this case, the staying time of resin in the cylinder chamber was 10 minutes, the mold capacity was 50% and the shot time was one minute.

EXAMPLE 2

The strength of molded products obtained from injection molding with the PET of average molecular weight of 16,000 to 17,000 and water content of less than 0.05% blended with other polymer or inorganic fillers while accurately controlling the resin temperature as in case of Example 1 is given in Table 3. In the following all examples, the cylinder temperature was 235° C. for I, 250° C. for II and 270° for III, the injection nozzle temperature was 265° to 270° C., the actual temperature of resin fed out from the injection nozzle was 265° C.±2° C. and the mold temperature was 50° C.±2° C.

TABLE 3

| Material and blending ratio | Tensile strength of molded product (kg/cm$^2$) |
|---|---|
| PET virgin material without addition | 620 |
| PET virgin material with titanium added | 653 |
| PET film scraps without addition | 567 |
| PET virgin material + 20% of glass fiber | 1031 |
| PET scraps + 20% of glass fiber | 1211 |
| PET scraps + 10% of glass fiber | 1019 |
| PET scraps + nylon 50% | 580 |

In the above table, the blending ratio indicates the weight % for the molded products. (This is the same in the following example.)

EXAMPLE 3

In the injection molding by accurately controlling the temperature of the PET of average molecular weight of 13,000 to 17,000 and water content of less than 0.05% and varying the mold temperature, the tensile strength and the drawing rate of obtained molded products are as given in Table 4. In this case, the cylinder temperature of the injection molding machine was 250° C., 260° C. and 265° C., the injection nozzle temperature was 265° C., the temperature of resin fed out from the injection nozzle was 265°±2° C.

TABLE 4

| Material (PET) | Mold temp. (°C.) | Tensile strength (kg/cm$^2$) | Drawing rate (%) |
|---|---|---|---|
| Virgin material | 30–35 | 551 | |
| " | 30–35 | 541 | |
| Scrap | 20–24 | 568 | |
| " | 30–35 | 527.8 | 113.4 |
| " | 45 | 506.4 | 32 |
| " | 50 | 460 | 4 |
| " | 60 | 479 | 4 |

As described above, the molded products with various characteristics were obtained by controlling the temperature of resin to a fixed value and varying the temperature of the molds. When the temperature of the mold was low, tough molded products were obtained since there were many non-crystallized parts in the molded product and crystalline sizes were small even in the crystallized parts.

EXAMPLE 4

Such products as bushes, knobs, lids, nuts, meter hoods, rollers, gears etc. were molded under the molding conditions shown in Table 6 using the materials blended as shown in Table 5 after drying at 130° C. for 5 to 6 hours to reduce the water content to less than 0.1% before the molding. The characteristics shown in Table 7 were obtained from examinations of the test pieces molded under these molding conditions. In this case, the molecular weight of the PET was 12,000 to 18,000, the staying times of resin in the cylinder chamber was 10 to 15 minutes, the mold capacity was 30 to 60% and the shot time was ½ to 3/2 minutes. The variation of the temperature of resin fed out from the nozzle was maintained to be within the set temperature ±3° C.

TABLE 5

| No. | Material | |
|---|---|---|
| 1 | PET virgin + polyethylene | 10% |
| 2 | PET virgin + polyethylene | 20% |
| 3 | PET virgin + ABS resin | 10% |
| 4 | PET virgin + ABS resin | 20% |
| 5 | PET virgin + nylon 6 | 25% |
| 6 | PET virgin + nylon 6 | 50% |
| 7 | PET virgin + polybutylene terephthalate | 10% |
| 8 | PET virgin + polybutylene terephthalate | 20% |
| 9 | PET virgin + glass fiber | 10% |
| 10 | PET (scrap) + glass fiber | 20% |
| 11 | PET (scrap) + glass fiber | 30% |
| 12 | PET (scrap) + glass fiber | 30% |
| 13 | PET (virgin) 1:PET (scrap) 1 | |
| 14 | PET (virgin) 1:PET (scrap) 2 + glass fiber | 20% |
| 15 | PET (virgin) 1:PET (scrap) 2 + glass fiber | 30% |
| 16 | PET (virgin) 1:PET (scrap) 2 + glass fiber | 30% + quartz 10% |
| 17 | PET (virgin) 1:PET (scrap) 1 + glass fiber | 30% + quartz 10% + BN 0.5% |
| 18 | PET (virgin) 1:PET (scrap) 1 + glass fiber | 30% + carbon 0.5% |

TABLE 6

| | Cylinder temp. °C. | | | | |
|---|---|---|---|---|---|
| No. | Low temp. part | High temp. part | Nozzle temp °C. | Mold temp. °C. | Screw revolution r.p.m. |
| 1 | 240 | 260 | 270 | 30–40 | 68 |
| 2 | " | 270 | " | " | " |
| 3 | " | 260 | " | " | " |
| 4 | " | " | " | " | " |
| 5 | " | " | " | " | " |
| 6 | " | 255 | " | " | " |
| 7 | 230 | 260 | 265 | " | " |
| 8 | " | 255 | " | " | " |
| 9 | 260 | 275 | 280 | " | " |
| 10 | " | 280 | " | " | " |
| 11 | " | 285 | 285 | " | " |
| 12 | 270 | 290 | " | 140 | " |
| 13 | 250–260 | 270–275 | 275 | 30–40 | " |
| 14 | 260 | 280 | 280 | 140–150 | " |
| 15 | 270 | 285 | 285 | " | " |
| 16 | 275 | 290 | " | " | " |
| 17 | " | " | " | 145–150 | " |
| 18 | " | " | " | " | " |

Note: The mold temperature was maintained within the set temperature ±5° C.

TABLE 7

| No. | Strength kg/cm$^2$ | Resilience | Heat resistance °C. (Softening point) |
|---|---|---|---|
| 1 | 420 | Good | |
| 2 | 365 | " | |
| 3 | 540 | " | |

TABLE 7-continued

| No. | Strength kg/cm² | Resilience | Heat resistance °C. (Softening point) |
| --- | --- | --- | --- |
| 4 | 465 | " | |
| 5 | 535 | Fairy good | 110 |
| 6 | 565 | Good | 120 |
| 7 | 515 | " | 60–65 |
| 8 | 497 | " | 60 |
| 9 | 750 | Bad | 150 |
| 10 | 870 | " | 180–200 |
| 11 | 1215 | " | 230–240 |
| 12 | 1105 | " | 240–250 |
| 13 | 520–600 | Good | 70–80 |
| 14 | 920 | Bad | 180–200 |
| 15 | 1260 | " | 230–240 |
| 16 | 1180 | " | 240–250 |
| 17 | 1160 | " | 245–250 |
| 18 | 1280 | " | 240–245 |

EXAMPLE 5

Rod type chips of 2 mm φ were obtained by molding a virgin material of the PET of average molecular weight of 16,000 to 18,000 without preliminary drying treatment (water content was less than 1%) using the vent type extrusion molding machine with vacuum pump under the conditions such as the pressure of less than 50 mm Hg, the temperature of 270° C. at the low temperature part of the cylinder, the temperature of 280° to 290° C. at the high temperature of the cylinder and the nozzle temperature of 275° to 280° C. of which variation was maintained to be within ±30° C., the size of screw of 90 mm and the cooling water of less than 50° C. When the rod type chip product was bent many times, they were not broken and the molecular weight did not nearly reduce, approximately less than 5%, and the molded products with the same characteristics as in case the PET was previously dried at 130° C. for 4.5 to 6 hours were obtained. This was the same when PET scraps were used as the PET material.

EXAMPLE 6

The products such as nuts, rollers etc. were molded as in Example 4 by molding the virgin material of PET and PET scraps which were blended with 10 to 40 weight % of inorganic fillers such as glass fiber, feldspar, quartz without the preliminary drying treatment using the vent type injection molding machine under the condition that the material contained approximately 0.5% of water content and the pressure in the cylinder chamber was less than 100 mm Hg. The physical properties of these molded products were satisfactory and the crystallized products were hardly broken and were extremely strong even when hammered or powerfully thrown onto a wall. Reduction of the pressure in the cylinder to less than 100 mm Hg did not affect the physical properties of the molded products even though the material contained approximately 0.5% of water.

EXAMPLE 7

Cylindrical dome type products of approximately 2 mm in thickness, 13 cm in height and 8 cm in inside diameter were molded with the PET blended with other polymers and inorganic fillers as in case of Example 4 after introducing dry nitrogen gas from the lower part of the hopper to make it counterflow against the flow of material and to replace with air in the material when feeding the material through the hopper, under the conditions such as the temperature at the low temperature part of the cylinder of 250° to 255° C. the temperature at high temperature part of the cylinder of 275° to 280° C. and nozzle temperature of 280° C. of which variations were respectively maintained to be ±3° C., the mold temperature of 30° to 35° C., screw revolution of 70 r.p.m and the cycle of one shot of 40 seconds. The section of this molded product presents a blue color which indicates evidently that the PET has not been oxidized and deteriorated by oxygen during the molding as compared with the surface of the products which are molded without counterflow of nitrogen gas and have a yellow section. The toughness of this molded product is extremely high. For example, when the dome type molded product is striken by vertically blowing down the hammer, the product molded without using nitrogen gas is broken by hammering 3 to 5 times while the product molded with nitrogen gas is broken by hammering 6 to 10 times and the impact resistance of the latter molded product is improved by 30 to 50%. This effect brings about the similar results regardless of the crystallinity of molded products. For example, this is the same with a molded product of 3 ounces from a machine of 11 ounces.

EXAMPLE 8

In molding a roller of approximately 12 mm in wall thickness and approximately 3 cm in diameter with a circular hole of 1.5 mm diameter, using a virgin material and scraps of the PET of average molecular weight of 12,000 to 17,500 and water content of less than 0.05 weight %, the effect on the staying time of the PET in the cylinder was examined using a mold (with one cavity) for a product of approximately 12 g.

1. Molding conditions

| | |
| --- | --- |
| Drying condition for material | 130° C. 5–6 hr |
| Cylinder temperature at low temperature part | 250–260° C. |
| Cylinder temperature at high temperature part | 270–275° C. |
| Screw revolution | approx. 70 r.p.m. |
| Mold temperature | 30° C. ± 2° C. |
| 1 shot time | 90 seconds |

Size of the injection molding machine 1, 2.5 and 5 ozs

2. Relations between the staying time and the physical properties of molded products

TABLE 8

| | Size of molding machine | Mold volume Max. shot volume | Staying time (min) | Breaking strength kg/cm² | Dropping height to breakage |
| --- | --- | --- | --- | --- | --- |
| (1) | 5 ozs | 1/10 | 45–60 | 10 or less | 1 m or less |
| (2) | 2.5 ozs | 1/5 | 24–30 | 300–600 | 40 m or more |
| (3) | 1 oz | 1/2 | 12–15 | 1000–1300 | 50 m or more |

Note: The mold capacity is the total of the volumes of the molded product and the runner.

The above breaking strength (pressure test) was obtained when the roller shown above in a longitudinal position with width of 12 mm and height of 3 cm was depressed and the product shown in (2) and (3) in a cross position showed the strength more than 5,000 kg/cm². In case of condition (3), no breakage was observed even when the product was powerfully thrown against the wall.

Accordingly, the staying time of the PET in the heated cylinder should be within 15 minutes to obtain tough molded products and the size of mold should be more than 50% of the maximum shot volume of the molding machine.

EXAMPLE 9

Such products as bushes, knobs, lids, nuts, meter hoods, rotors, gears, bobbins were molded with the pulverized particles of film scraps of PET of average molecular weight of 12,000 to 13,500 and water content of less than 0.05% blended with the materials shown in Table 9 under the conditions shown in Table 9. The characteristics of these molded products are shown in Table 10. In this case, the staying time was 5 to 15 minutes, the mold capacity was 20 to 60% and the shot time was 30 seconds to 2 minutes.

TABLE 9

| | | Molding conditions | | | |
|---|---|---|---|---|---|
| | | Cylinder temp. | | Nozzle | Screw | Mold |
| No. | Blended material | Low temp. part °C. | High temp. part °C. | temp. °C. | revolution r.p.m. | temp. °C. |
| 1 | Polyethylene, 10 weight % | 240 | 270 | 270 | 68 | 30–40 |
| 2 | Polyethylene, 20 weight % | 240 | 260 | " | " | " |
| 3 | ABS resin, 5 weight % | 240 | 260 | 270 | " | " |
| 4 | ABS resin, 10 weight % | 240 | 260 | " | " | " |
| 5 | Nylon 6, 25 weight % | 240 | 260 | " | " | " |
| 6 | Nylon 6, 50 weight % | 230 | 255 | " | " | " |
| 7 | Polybutylene terephthalate, 10 weight % | 230 | 260 | " | " | " |
| 8 | Polybutylene tere—phthalate, 20 weight % | 230 | 255 | " | " | " |
| 9 | Glass fiber, 10 weight % | 250 | 275 | 280 | " | " |
| 10 | Glass fiber, 20 weight % | 250 | 275 | 280 | " | " |
| 11 | Glass fiber, 30 weight % | 250 | 280 | " | " | " |
| 12 | Glass fiber, 30 weight % + feldspar, 10 weight % | 250 | 280 | " | " | " |

TABLE 10

| | Physical Properties of Molded Products | | |
|---|---|---|---|
| No. | Resilience | Strength (kg/cm$^2$) | Heat resistance (softening temp.) |
| 1 | Good | 400 | |
| 2 | " | 350 | |
| 3 | " | 400 | |

TABLE 10-continued

| | Physical Properties of Molded Products | | |
|---|---|---|---|
| No. | Resilience | Strength (kg/cm$^2$) | Heat resistance (softening temp.) |
| 4 | " | 300 | |
| 5 | " | 400 | 110° C. |
| 6 | " | 350 | 125° C. |
| 7 | " | 470 | |
| 8 | Bad | 450 | |
| 9 | " | 400 | 150° C. |
| 10 | " | 850 | 180–200° C. |
| 11 | " | 1250 | 230–240° C. |
| 12 | " | 1100 | 245–250° C. |

EXAMPLE 10

The similar products to Example 9 were molded with the pulverized particles of PET scraps of average molecular weight of 12,000 to 13,5000 to which PET pellets of average molecular weight of 15,000 to 17,000 and other substances were added to control the water content to less than 0.05% under the molding conditions shown in Table 11. The characteristics of these molded products are as shown in Table 12.

TABLE 11

| | | | Molding Conditions | | | |
|---|---|---|---|---|---|---|
| | | | Cylinder temp. | | Nozzle | Mold |
| No. | PET scrap: PET pellet | Blended material | Low temp. part °C. | High temp. part °C. | temp. °C. | temp. °C. |
| 13 | 1:1 | — | 250° C. | 270 | 270 | 30–40 |
| 14 | 1:2 | — | " | " | " | " |
| 15 | 2:1 | — | " | " | " | " |
| 16 | 3:1 | — | " | " | " | " |
| 17 | 4:1 | — | " | " | " | " |
| 18 | 2:1 | Glass fiber 10 weight % | 255 | 275 | 280 | 145 |
| 19 | 2:1 | Glass fiber 20 weight % | " | " | " | " |
| 20 | 2:1 | Glass fiber 30 weight % | 260 | 280 | " | " |
| 21 | 2:1 | Glass fiber | 265 | 285 | 285 | 145 |

TABLE 11-continued

| | | | Molding Conditions | | | |
| | | | Cylinder temp. | | Nozzle | Mold |
| No. | PET scrap: PET pellet | Blended material | Low temp. part °C. | High temp. part °C. | temp. °C. | temp. °C. |
|---|---|---|---|---|---|---|
| 22 | 2:1 | 30 weight % + feldspar, 10 weight % Glass fiber, 30 weight % + quartz, 10 weight % | " | " | " | " |

TABLE 12

Physical Properties of Molded Products

| No. | Resilience | Strength (kg/cm$^2$) | Heat resistance (softening temp.) |
|---|---|---|---|
| 13 | Good | 450-500 | 70-75° C. |
| 14 | " | " | " |
| 15 | " | " | " |
| 16 | " | " | " |
| 17 | " | " | " |
| 18 | Bad | 700 | 150° C. |
| 19 | " | 900 | 210° C. |
| 20 | " | 1250 | 240° C. |
| 21 | " | | 245° C. |
| 22 | " | | 245-250° C. |

As shown in Example 9 and Example 10, the pulverized particles of scraps and waste molded products of the PET can be used as are and need not be pelletized in advance. Any types of scraps can be molded after having been pulverized. Accordingly, the manufacturing processes can be simplified, scraps can be reproduced efficiently at low costs and a large quantity of fabric material such as glass fiber can be added and need not be cut in a small size before use, and can be blended as are long, thus obtaining tough molded products with satisfactory characteristics. Since PET pellets, pellets of other polymers, fibers, powdery inorganic substances etc. can be added to the scraps or pulverized particles of waste PET products, inefficient feeding of the material to the screw of the molding machine due to small specific gravity of the pulverized particles of the PET is eliminated, apparent specific gravity of the entire material becomes large and the material can be satisfactorily fed to the screw and passed through the cylinder positively and efficiently, and thus tough products with various characteristics can be injection- or extrusion-molded.

EXAMPLE 11

Pellets of the PET were molded with the materials shown below by the vent type extrusion molding machine with vacuum pump under the molding conditions given below. In this case, the average molecular weight of the PET was 12,000 to 18,000, water content was less than 1%, the pressure in the cylinder was maintained at 50 mm Hg and the staying time of the material in the cylinder was 3 to 4 minutes.

TABLE 13

| | Material | | Molding condition (Temp. in cylinder °C.) | |
|---|---|---|---|---|
| No. | Kind of PET | Blended material (weight %) | Low temp. part | High temp. part |
| 1 | Pellet | Polyethylene, 10 | 240 | 270 |
| 2 | " | Polyethylene, 20 | 230 | 270 |
| 3 | " | Nylon 6, 20 | 250 | 270 |
| 4 | " | Nylon 6, 40 | 240 | 260 |
| 5 | " | ABS resin, 5 | 230 | 265 |
| 6 | " | ABS resin, 10 | " | " |
| 7 | " | Polybutylene terephthalate 10 | 240 | " |
| 8 | " | Polybutylene terephthalate 20 | " | 260 |
| 9 | Pellet: pulverized particles of film 1:1 | Glass fiber, 20 | 250 | 270 |
| 10 | 2:1 | " | " | " |
| 11 | 3:1 | " | " | " |
| 12 | 1:2 | " | " | " |
| 13 | 1:3 | " | " | " |
| 14 | 1:4 | " | " | " |
| 15 | 1:1 | Glass fiber, 10 | " | 280 |
| 16 | 1:1 | Quartz, 20 | " | " |
| 17 | 1:1 | Quartz, 30 | " | " |
| 18 | 1:1 | Quartz, 10 | " | " |
| 19 | 1:1 | Feldspar, 10 | " | " |
| 20 | 1:1 | Glass fiber, 20 + feldspar, 10 | " | " |
| 21 | 1:1 | Glass fiber, 20 + quartz, 10 | " | " |

The pellets shown in Table 13 which were manufactured under the above conditions were injection molded to obtain various types of molded products. The physical properties of these molded products are as shown in Table 14.

In this case, the screw revolution was 68 r.p.m. and the mold temperature was 40° to 50° C. for Nos. 1 to 8 and 45° to 50° C. for Nos. 9 to 21. The water content of each pellet was less than 0.05%, the mold capacity was 30 to 60% and the shot time was 0.5 to 2 minutes.

TABLE 14

| | Molding temperature | | | Physical properties of molded products | | |
| No. | Low temp. part | High temp. part | Nozzle temp. | Impact resistance | Resilience | Heat resistance (softening temp.) |
|---|---|---|---|---|---|---|
| 1 | 240° C. | 265° C. | 270° C. | 3 | Good | 100° C. |
| 2 | 230 | 260 | 265 | 6 | Excellent | 120° C. |
| 3 | 250 | 265 | 270 | 3 | Good | 100° C. |
| 4 | 240 | 260 | 265 | 5 | Good | 120° C. |
| 5 | 230 | 260 | 265 | 4 | Good | 65° C. |
| 6 | 220 | 255 | 265 | 5 | Good | 60° C. |
| 7 | 230 | 260 | 265 | 4 | Good | 65° C. |

TABLE 14-continued

| | Molding temperature | | | Physical properties of molded products | | |
|---|---|---|---|---|---|---|
| No. | Low temp. part | High temp. part | Nozzle temp. | Impact resistance | Resilience | Heat resistance (softening temp.) |
| 8 | 230 | 255 | 265 | 5 | Good | 60° C. |
| 9 | 250 | 270 | 275 | 7 | Good | 180–200° C. |
| 10 | " | " | " | 8 | Good | " |
| 11 | " | " | " | 8 | Good | " |
| 12 | " | " | " | 6 | Good | " |
| 13 | " | " | " | 6 | Good | " |
| 14 | " | " | " | 6 | Good | " |
| 15 | 260 | 275 | 280 | 6 | Bad | 130° C. |
| 16 | " | " | " | 8 | Bad | 200° C. |
| 17 | " | " | " | 6 | Bad | 235° C. |
| 18 | " | " | " | 4 | Fairy good | 135° C. |
| 19 | " | " | " | 3 | Fairy good | 130° C. |
| 20 | " | " | " | 6 | Bad | 230° C. |
| 21 | " | " | " | 6 | Bad | 235° C. |

The impact resistance was measured from the number of times of dropping a molded product (bush) which was mounted on one end of a steel tube of 80 cm in length and ¾" in diameter from a height of 1 m in the vertical direction until the molded product was broken.

As described above, when the PET of average molecular weight of more than 10,000 is blended with less than 60 weight % of other polymers and inorganic fillers, this blended material is extruded into specified shapes after the PET and other polymers and inorganic fillers have been melted and kneaded each other and a material for molding which integrally contains the PET and other polymers and inorganic fillers is manufactured, this material for blending does not nearly contain water and oxygen which cause hydrolysis and thermal deterioration and can be directly used without various blendings shortly before the molding. Moreover, the scraps and wastes of the PET can also be used and therefore excellent tough molded products with further improved characteristics of the PET can be manufactured easily, positively and stably at low costs.

EXAMPLE 12

The test piece was made at various mold temperatures using a mixture shown in Table 15 which was prepared by adding glass fiber and others to virgin PET (A) of average molecular weight of approximately 17,000, virgin PET (B) of average molecular weight of approximately 25,000 and waste PET of average molecular weight of approximately 13,000 (water content of each material was less than 0.1 weight %), and the results of measurement of the impact strength (sharpy impact value) were obtained as shown in Table 15.

The cylinder temperature was 250° C. (I), 260° C. (II) and 280° C. (III) and the nozzle temperature was 280° C. The temperature of resin flowing out from the nozzle was accurately controlled and the mold temperature was also accurately controlled. The staying time of resin in the cylinder was within 10 minutes, screw revolution 67 r.p.m., mold capacity approximately 30 volume %, shot time approximately 1 minute.

TABLE 15

| | Material blending ratio (weight %) | | | | | | | Mold temp °C. | Impact resistance kg/cm² with notch | Tensile strength (kg/cm²) |
|---|---|---|---|---|---|---|---|---|---|---|
| | Virgin | | Waste | | | | | | | |
| No. | PET A | B | PET | Glass fiber | Glass balls | Feldspar powder | Quartz powder | | | |
| 1 | 35 | | 35 | 30 | | | | 25 | 17.21 | 1242 |
| 2 | 35 | | 35 | | 30 | | | 25 | 3.3 | 457 |
| 3 | 40 | | 40 | 10 | 10 | | | 25 | 5.16 | 816 |
| 4 | 40 | | 40 | 5 | 5 | 5 | 5 | 25 | 2.9 | 660 |
| 5 | 35 | | 35 | 30 | | | | 50 | 11.32 | 1269 |
| 6 | 40 | | 40 | 10 | 10 | | | 50 | 5.31 | 818 |
| 7 | 35 | | 35 | 30 | | | | 145 | 5.18 | 1007 |
| 8 | 35 | | 35 | | 30 | | | 145 | 2.1 | 500 |
| 9 | | 100 | | | | | | 25 | 4.1 | 565 |
| 10 | | 50 | 50 | | | | | 25 | 3.3 | 582 |
| 11 | | 40 | 40 | 20 | | | | 135 | 6.74 | 771 |
| 12 | | 40 | 40 | 20 | | | | 145 | 5.7 | 842 |

As known from the results shown above, the injection molded product with excellent impact resistance can be obtained in molding at a low temperature of the mold. It is recommended that the mold temperature be raised to obtain the injection molded products with excellent heat resistance.

As shown in the above results, in case of the molding for which the mold temperature is particularly raised to a high degree, a considerable variation of physical properties (for example, No. 11 and No. 12) is observed with respect to 10° C. difference of the mold temperature and accordingly it is known that the mold temperature should be controlled so that the variation of the mold temperature is within 5° C. higher and lower than the set temperature.

What is claimed is:

1. A method of manufacturing molded products from material selected from the group consisting of polyethylene terephthalate having an average molecular weight more than about 10,000 (I.V. about 0.39), a combination of said polyethylene terephthalate as the primary component and a second polymer component selected from the group consisting of polyethylene, polypropylene, polystyrene, acrylonitrile-butadiene-styrene, polybutylene terephthalate, polyamide 6, polyamide 66, polyamide 7, polyamide 11, polyamide 12, cotton, hemp, and rayon in an amount of from 5% to 60% by weight, or a blend of said polyethylene terephthalate as the primary component and an inorganic material selected from the group consisting of boron nitride, glass fiber, glass balls, glass powder, feldspar, quartz, aluminum oxide, marble, metal fibers, metal powder and metal whiskers, and a mixture of said polyethylene terephthalate as the primary components with said polymer component and said inorganic material, by one of injection or extrusion means in a molding machine having a screw conveyor cylinder provided with controllable heating means, a hopper at one end of said cylinder, and a discharge means at the other end of said cylinder selected from at least one of a nozzle, die, and adapter, comprising:
  (a) providing said material with a water content of less than about 1.0% by weight;
  (b) maintaining the inside wall temperature of said cylinder within a range of plus or minus 35° C. of the melting temperature of the material;
  (c) keeping the temperature of a first portion of the inside wall of said cylinder located adjacent said one end lower than the melting temperature of said material and sufficient to achieve substantially complete dehydration or negligible hydrolysis and heat deterioration of the material prior to the material reaching a second portion of the inside wall of the cylinder in the direction of travel of material;
  (d) controlling the temperature of the second portion of said inside wall of said cylinder which extends from a position intermediate its opposite ends to said other end at a temperature higher than the melting temperature of said material, while controlling the temperature difference between said first and second portions of said inside wall below 70° C.;
  (e) bringing the temperature of said molding temperature to a predetermined maximum at the outlet zone adjacent said discharge means;
  (f) controlling the temperature of the inside of the cylinder by directly measuring the actual temperature of the molding material as it passes through the one of the nozzle, die and adapter of the molding machine; and
  (g) controlling the residence of time of said molding material in said cylinder in response to the cylinder temperature so that the residence time is reduced as the temperature is increased whereby the residence time of said material in said cylinder is less than about 23 minutes.

2. The method of claim 1 wherein said material containing polyethylene terephthalate having an average molecular weight in the range of 10,000 to 30,000 (I.V. about 0.39 to 0.82) is injection molding in an injection molding machine by:
  (a) providing said material with a water content between 0.01% to 0.1% by weight;
  (b) maintaining the temperature inside said cylinder within a range plus or minus 30° C. of the melting temperature of said material and further controlling the temperature of the inside wall of the cylinder by maintaining the temperature of said material within a range of plus 28° C. or minus 10° C. of the melting temperature of said material as it exits said discharge means;
  (c) presetting the temperature of a mold used in conjunction with said injection molding machine to a temperature between 10° C. and 160° C. and keeping the temperature of said mold within plus or minus 5° C. of said preset temperature;
  (d) providing a mold capacity that is more than 25% by volume of the maximum shot volume of said injection molding machine; and
  (e) controlling the shot time so that it is within 3 minutes.

3. The method of claim 1 wherein said material containing polyethylene terephthalate having an average molecular weight in the range of 10,000-30,000 (I.V. 0.31 to 0.82) is injection molded in a vent type injection molding machine by:
  (a) providing said material with a water content of between 0.05% and 0.5% by weight;
  (b) decreasing the pressure in said cylinder to a range of 10-100 mm Hg;
  (c) maintaining the temperature of the inside wall of said cylinder within a range of plus or minus 30° C. of the melting temperature of said material and further controlling the temperature of the inside wall of said cylinder by maintaining the temperature of said material within a range of plus 28° C. minus 10° C. of the melting temperature of said material as it exits said discharge means;
  (d) presetting the temperature of a mold used in conjunction with said vent type injection molding machine to a temperature between 10° C. or 160° C. and keeping the temperature of said mold within a range of plus or minus 5° C. of said preset temperature;
  (e) providing a mold capacity that is more 25% by volume of the maximum shot volume of said vent type injection molding machine; and
  (f) controlling the shot time so that it is within 3 minutes.

4. The method of claim 1 wherein said material containing polyethylene terephthalate having an average molecular weight in the range of 10,000-30,000 (I.V. about 0.39 to 0.82) is extrusion molded in an extrusion molding machine by:
  (a) providing said material with a water content of between 0.01% and 0.1% by weight;
  (b) controlling the temperature of the inside of said cylinder by keeping the temperature of said material within a range of plus 30° C. or minus 15° C. of the melting temperature of said material as said material exits said discharge means;
  (c) controlling the residence time of said molding material in said cylinder to be within 15 minutes;
  (d) maintaining the temperature of said discharge means so that it is within a range of minus 15° C. or plus 30° C. of the melting temperature of said material.

5. The method of claim 1 wherein said material containing polyethylene terephthalate having an average molecular weight in the range of 10,000-30,000 (I.V. about 0.39 to 0.82) is extrusion molded in a vent type extrusion molding machine by:
  (a) providing said material with a water content of between 0.1% and 0.8% by weight;
  (b) decreasing the pressure in said cylinder to a range of 10-100 mm Hg;

(c) controlling the temperature of the inside of said cylinder by keeping the temperature of said material within a range of plus 30° C. or minus 10° of the melting temperature of said material as it exists said discharge means;

(d) controlling the residence time of said molding material in said cylinder to be within 15 minutes; and (e) maintaining the temperature of said discharge means in a range between minus 15° C. or plus 30° C. of the melting temperature of said material.

6. The method of claim 5 wherein said polyethylene terephthalate is selected from those having average molecular weight in the range of 12,000-28,000 and the water content of said selected polyethylene terephthalate is provided in the range of between 0.1-0.8% by weight.

7. A method of claim 2 wherein said polyethylene terephthalate has molecular weight in the range of 15,000-30,000 and said mold capacity is controlled in the range of 25-90% by volume of the maximum shot volume of said injection molding machine.

8. The method of claim 2 wherein said molding material includes polyethylene terephthalate having a molecular weight in the range of 10,000-28,000 at least a portion of which is scrap of the polyethylene terephthalate being used, the water content of said polyethylene terephthalate provided in the range of from 0.011 to 0.1% by weight, and said mold capacity being provided in the range of 35-95% by volume of the maximum shot volume of said injection molding machine.

9. The method of claim 1 wherein after completion of polymerization of said polyethylene terephthalate or its similar polymer, in a molten state it is blended with other of said polymer and/or inorganic material in a polymerizing oven with a pressure of less than 50 mm hg, and at a temperature of within the range of plus or minus 25° C. with respect to the melting temperature of said material, and thereafter the mixture of said polyethylene terephthalate and/or its similar polymer is extruded in desired configurations.

10. The method of claim 9 wherein said blending is carried out at a temperature within the range of plus/minus 25° C. of the melting temperature of said material.

11. The method of claim 1 wherein said material includes one of cotton, hemp, rayon, and mixtures thereof, and actual temperature of said material as it exits said discharge means being restricted to be between plus 5° C. or minus 15° C. of the melting temperature of said material, and the residence time of said material in said cylinder being restricted to be within 10 minutes.

12. The method of claim 1 wherein said material includes one of cotton, hemp, rayon, and mixtures thereof, the actual temperature of said material as it exits said discharge means being restricted to be between plus 8° C. or minus 15° C. of the melting temperature of said material, and the residence time of said material in said cylinder being restricted to be within 10 minutes.

13. The method of claim 9 wherein said material includes cotton, hemp, rayon, and mixtures thereof, the actual temperature of said molding material as it exits said discharge means being restricted to be within plus 8° C. or minus 12° C. of the melting temperature of said material, and the residence time of said material being restricted to be within 8 minutes.

14. A method of claim 1 wherein said molding material as it is passing through or coming out one of the nozzle, die and adaptor in the discharge means of the cylinder is within plus or minus 5° of said predetermined maximum temperature, and the residence time of said molding material in said cylinder being less than about 15 minutes.

15. A method in accordance with claim 1 wherein the other polymers and inorganic material are restricted to those not decomposed, not deteriorative and excellent in heat resistance, said inorganic material being excellent in dispersability, not disadvantageous in chemical reaction with the polyethylene terephthalate, not decomposed, not deteriorative, and the particle size or any powder inorganic materials to blend with polyethylene terephthalate being finer than 100 mesh and preferably smaller than 250 mesh or finer than 50 micron.

16. A method in accordance with claim 1 wherein in the step (d) the temperature difference between the first and second mentioned portions of the inside wall of the cylinder is controlled to be within the range of from 10° C. to 60° C.

17. A method in accordance with claim 1 wherein the cylinder having a proper screw and nozzle is suitably selected according to the kind of said molding material and use of the resultant molded product.

18. A method of manufacturing molded product from material selected from the group consisting of polyethylene terephthalate having an average molecular weight more than about 10,000 (I.V. about 0.39), a combination of said polyethylene terephthalate as the primary component and a second polymer component selected from the group consisting of polyethylene, polypropylene, polystyrene, acrylonitrile-butadiene-styrene, polybutylene terephthalate, polyamide 6, polyamide 66, polyamide 7, polyamide 11, polyamide 12, cotton, hemp, and rayon in an amount of from 5% to 60% by weight or a blend of said polyethylene terephthalate as the primary component and an inorganic material selected from the group consisting of boron nitride, glass fiber, glass balls, glass power, feldspar, quartz, aluminum oxide, marble, metal fibers, metal powder and metal whiskers, and a mixture of said polyethylene terephthalate as the primary component with said polymer component and said inorganic material, in an injection or extrusion molding machine having a screw conveyor cylinder with a hopper at one end and a discharge means at the other end including at least one of a nozzle, die, and adapter, and heating control means comprising:

(a) providing a material with a controlled water content below 1.0% by weight;

(b) maintaining an inside wall temperature for the cylinder of the molding machine within a range plus or minus 35° C. with respect to the melting temperature of the molding material;

(c) controlling the temperature of the inside wall of the portion of the cylinder adjacent the one end so that it is lower than the temperature of the inside of the portion of the cylinder extending from a position intermediate its opposite ends to the other end and so that it is higher than the melting temperature of the material, and controlling the temperature difference between the first and second mentioned portions of the inside wall to be below 70° C.;

(d) controlling the temperature of the molding material in the portion of the cylinder at said one end below its melting point, and controlling the temperature of the molding material in the portion of the cylinder at said discharge means to a temperature of near its melting point or more than its melting point;

(e) controlling the actual temperature of the material while in the cylinder so that it is maximum at a zone near or adjacent the discharge means, said zone extending from the discharge means no longer than approximately ¼ of the length of the cylinder;

(f) controlling of an appropriate temperature of the inside of the cylinder by directly measuring the actual temperature of said material when it passes through the one of the nozzle, die, and/or adapter of the molding machine;

(g) controlling the actual temperature of the material while it is at a point between the discharge means and the center of the cylinder so that it is within the range of plus 35° C. or minus 50° C. of the melting temperature of the material and controlling the residence time of material within 15 minutes;

(h) maintaining the temperature of the nozzle or the die of the discharge means within the range of plus 35° C. or minus 15° C. of the melting temperature of the material, and control of the minimum and maximum temperature with respect to the melting temperature of the material so that the minimum temperature is 15° C. lower than the melting temperature of the material and the maximum temperature is 300° C.;

(i) controlling the residence time of said molding material in said cylinder in response to the cylinder temperature so that the residence time is reduced as the temperature is increased whereby the residence time of said material in said cylinder is less than about 23 minutes; and (j) controlling the temperature of the material when or after it passes the discharge means so that it is within the range of plus 35° C. or minus 15° C. of the melting temperature of the material and the temperature thereof passing through or coming out one of the nozzle, die and adapter is not higher than 300° C.

19. A method in accordance with claim 18 wherein the fluctuation temperature of the molding material coming out or pass through from one of the nozzle, die or adaptor of the discharge means is controlled so that it is within the range of plus and minus 5° with respect to a pre-set temperature, or maintaining the fluctuation of the inside temperature of said discharge means of the cylinder by pre-setting to be within plus and minus 3° C.

20. A method in accordance with claim 1 wherein said inorganic material is limited to ceramics as defined as inorganics other than metal and organics and being restricted to those not decomposed, not deteriorative and excellent in heat resistance, said inorganic material being excellent in dispersability, not disadvantageous in chemical reaction with the polyethylene terephthalate, not decomposed, not deteriorative and the particle size of any powder inorganic material to blend with polyethylene terephthalate being finer than 100 mesh and preferably smaller than 250 mesh or finer than 50 micron.

21. A method in accordance with claim 18 wherein said material contains at least one of the inorganics, isomer of polyethylene terephthalate and another polymer.

22. A method in accordance with claim 18 wherein the actual temperature of the material is controlled while it is at the point between the discharge means and the center of the cylinder so that it is within the range of plus 35° C. or minus 35° C. of the melting temperature of the material and controlling the residence time of material within 12 minutes.

* * * * *

UNITED STATES PATENT AND TRADEMARK OFFICE
CERTIFICATE OF CORRECTION

PATENT NO. : 4670203
DATED : June 2, 1987
INVENTOR(S) : Shao Chi Chang

It is certified that error appears in the above-identified patent and that said Letters Patent is hereby corrected as shown below:

At Column 8, Line 24 "though" should read --tough--

At Column 8, Line 47 "molding" should read --molding machine--

At column 9, Line 49 "crew" should read --screw--

At Column 14, Table 8, Line 54 "1 oz. 1/2" should read -- 1 Oz.
"12-15" should read --1/2--
"1000-1300" should read --12-15--
"50m or" should read --1000-1300--
"more" should read --50 or more--

At Table 14 #'s 18 & 19 in each case "fairy" should read --fairly--

Signed and Sealed this

Thirty-first Day of May, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,670,203
DATED : June 2, 1987
INVENTOR(S) : Shao Chi Chang

It is certified that error appears in the above-identified patent and that said Letters Patent is hereby corrected as shown below:

Column 4, line 56, "smaller" should read -- larger --.

Column 7, line 68, "olume" should read -- volume --.

Column 19, line 48, after "kneaded" insert -- into --.

Signed and Sealed this

Fifth Day of July, 1988

*Attest:*

DONALD J. QUIGG

*Attesting Officer*      *Commissioner of Patents and Trademarks*